United States Patent [19]

King

[11] Patent Number: 5,326,201
[45] Date of Patent: Jul. 5, 1994

[54] LOADER/UNLOADER FOR BLIND BROACHING

[75] Inventor: Carrol L. King, Shelby Township, Macomb County, Mich.

[73] Assignee: National Broach & Machine Company, Mt. Clemens, Mich.

[21] Appl. No.: 81,232

[22] Filed: Jun. 25, 1993

[51] Int. Cl.[5] ............................................. B23D 37/12
[52] U.S. Cl. ..................................... 409/251; 409/59; 409/263; 409/269; 409/273; 483/28
[58] Field of Search .............. 409/59, 250, 251, 252, 409/257, 262, 263, 268, 269, 273, 277; 483/28, 29; 408/70

[56] References Cited

U.S. PATENT DOCUMENTS

| | | |
|---|---|---|
| 1,627,755 | 5/1927 | Urschel ............................. 409/269 X |
| 2,280,229 | 4/1942 | Groene et al. . |
| 2,307,228 | 1/1943 | Monroe ............................. 409/273 |
| 2,365,040 | 12/1944 | Averill et al. . |
| 2,382,628 | 8/1945 | Green .............................. 409/251 |
| 2,522,712 | 9/1950 | Gotberg ............................ 409/59 |
| 3,526,956 | 9/1970 | Fulks .............................. 483/29 |
| 4,193,722 | 3/1980 | Bishop ............................. 409/59 |
| 4,401,401 | 8/1983 | Roseliep ........................... 409/244 |
| 4,432,130 | 2/1984 | Gabriele .......................... 409/273 X |
| 4,917,551 | 4/1990 | Roseliep ......................... 409/251 X |
| 5,167,603 | 12/1992 | Iwaniuk et al. .................. 409/263 X |
| 5,199,158 | 4/1993 | Wioskowski et al. ............. 408/70 X |

FOREIGN PATENT DOCUMENTS

| | | |
|---|---|---|
| 613877 | 7/1978 | U.S.S.R. . |
| 0701745 | 12/1979 | U.S.S.R. ...................... 409/59 |
| 732091 | 5/1980 | U.S.S.R. . |

Primary Examiner—Z. R. Bilinsky
Attorney, Agent, or Firm—Barnes, Kisselle, Raisch, Choate, Whittemore & Hulbert

[57] ABSTRACT

Apparatus for progressive blind broaching has an indexing table which carries a load station, a unload station and several tool stations. Broaches are mounted on the table at the tool stations. Rams on opposite sides of the table move workpieces up and down to be broached between intermittent indexing of the table. The load station has a workpiece holder to deliver unbroached workpieces to the rams. The unload station has a workpiece holder to receive broached workpieces from the rams. A transfer mechanism moves workpieces from a exchange depot at the rear of the table to the load station and moves workpieces from the unload station to the exchange depot. This transfer mechanism moves across the top of the table and does not occupy or obstruct any space along the sides or front of the table.

18 Claims, 7 Drawing Sheets

LOADER/UNLOADER FOR BLIND BROACHING

This invention relates generally to broaching and refers more particularly to loader/unloader mechanism for a dual ram broaching machine.

BACKGROUND AND SUMMARY

When broaching is done by an automatic broaching machine, mechanism is usually provided to load workpieces into the machine and also to unload the workpieces after broaching. It is important to accomplish loading and unloading efficiently and rapidly without taking up too much space or involving unnecessary equipment.

In the present invention, a loader/unloader mechanism is provided to place workpieces into a dual ram blind broaching machine, and after the workpieces are broached the same mechanism will remove the workpieces from the machine. The loader/unloader mechanism is specially designed for blind spline broaching machines equipped with index tables. The index table has a circle of broaches which move step-by-step under the workpiece-carrying rams to broach workpieces in a progressive manner.

The loader/unloader of this invention features single side loading whereby the workpieces for both rams enter and exit the mechanism from one side only of the machine. The loader/unloader is capable of loading and unloading workpieces for both rams in a minimum amount of time without increasing the broaching cycle.

In the machine about to be described, an indexing table is mounted for intermittent rotation and has a load station, an unload station and several tool stations arranged on the table in circumferentially spaced relation in a circle about the axis of rotation. Broaches are mounted on the table at the tool stations. Two rams are mounted on opposite sides of the table. Each ram is adapted to releasably support a workpiece to be broached above the circle of stations. The rams are moved toward and away from the table at intervals between intermittent table indexing to cause the broaches to perform a material removing cut on the workpieces. The load station delivers unbroached workpieces to the rams for broaching and the unload station receives broached workpieces from the rams after broaching. The loader/unloader comprises a shuttle for transferring unbroached workpieces from an exchange depot at the rear of the table to the load station and for transferring broached workpieces from the unload station to the exchange depot. The shuttle is supported on a stand at the rear of the table and moves through the open space above the table. No space is required at the front of the table for loading or unloading.

It is a primary object of this invention to provide loader/unloader for a broaching machine having the foregoing features.

Other objects are to provide a loader/unloader for a broaching machine which is composed of a relatively few simple parts, is rugged and durable in operation, and is relatively easy to operate and maintain.

These and other objects of the invention will become more apparent as the following description proceeds, especially when considered with the accompanying drawings.

DETAILED DESCRIPTION

Figure 1:
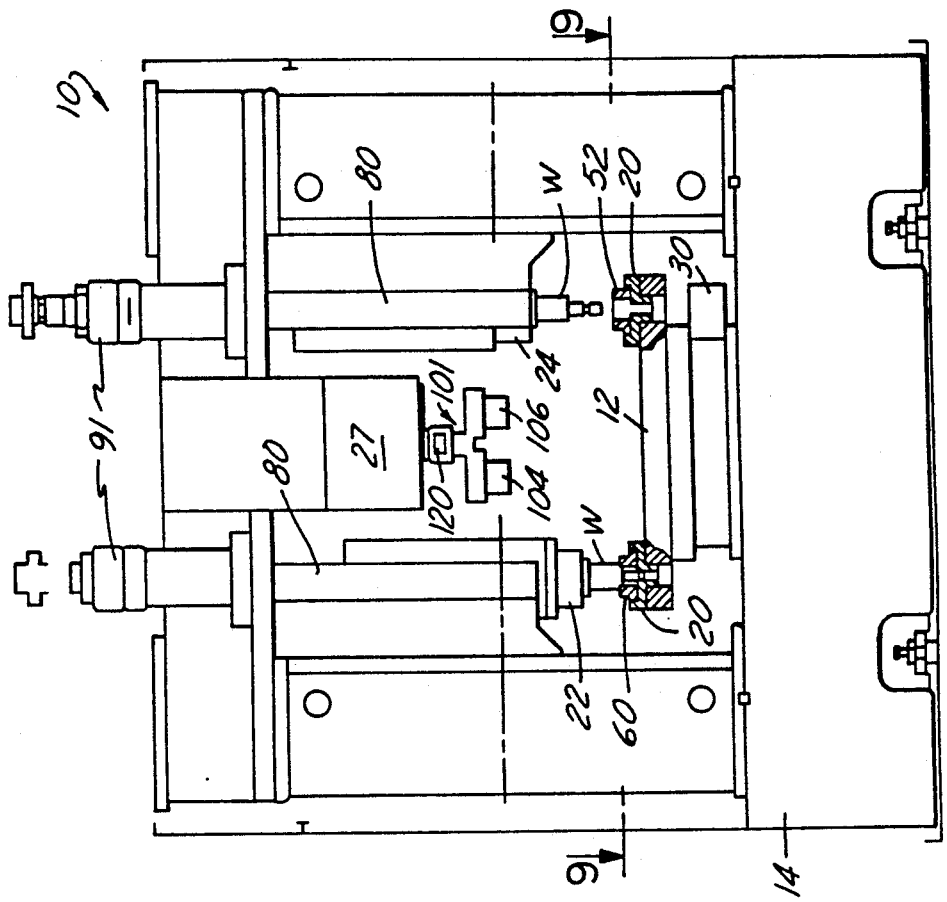
FIG. 1 is a front elevational view of a dual ram blind broaching machine having the loader/unloader mechanism of this invention.
Figure 2:
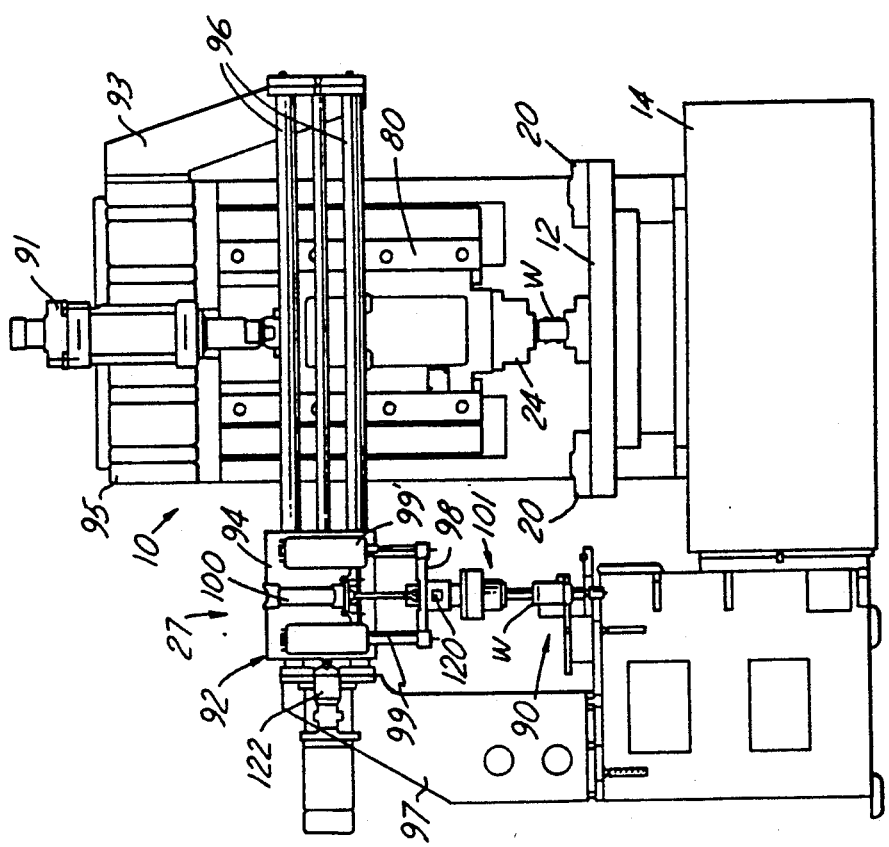
FIG. 2 is a side elevational view of the machine of FIG. 1, but with the ram on the near side removed for clarity, and showing the transfer shuttle adjacent to the exchange depot.
Figure 9:
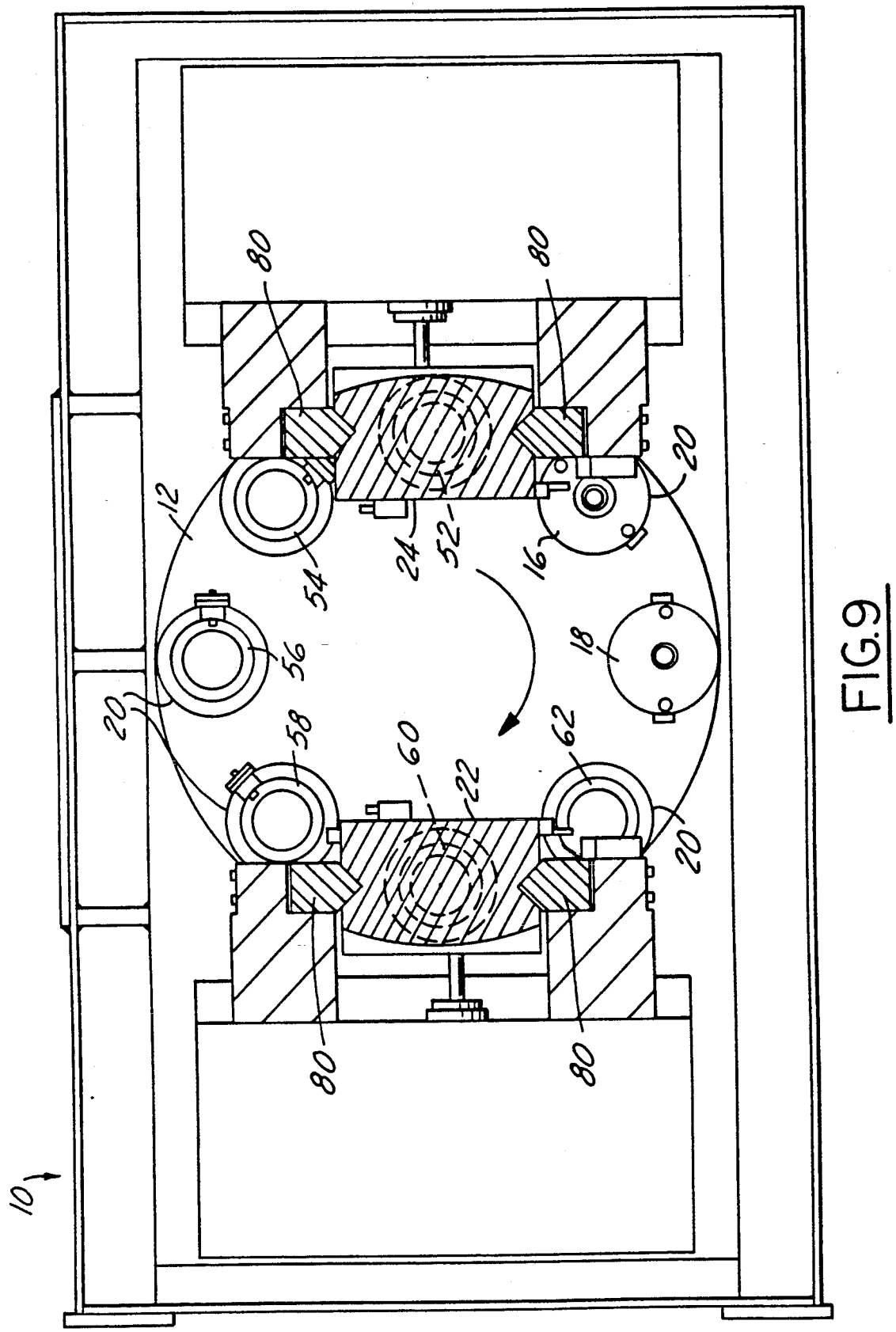
FIG. 9 is a view taken on the line 9—9 in FIG. 1, with the loader/unloader omitted.

Referring now more particularly to the drawings and especially to FIGS. 1, 2 and 9, the machine 10 has a rotatable indexing table 12 which is mounted on the machine base 14. The table has a load station 16, an unload station 18 and a plurality of tool stations 20 arranged in a circle about the axis of rotation of the table. Rams 22 and 24 on opposite sides of the table carry workpieces W and move up and down between table indexing to cause the workpieces to be progressively broached by broaches mounted on the table at the tool stations. A loader/unloader 27 is provided to deliver unbroached workpieces to the machine and to remove workpieces after broaching.

Figure 13:
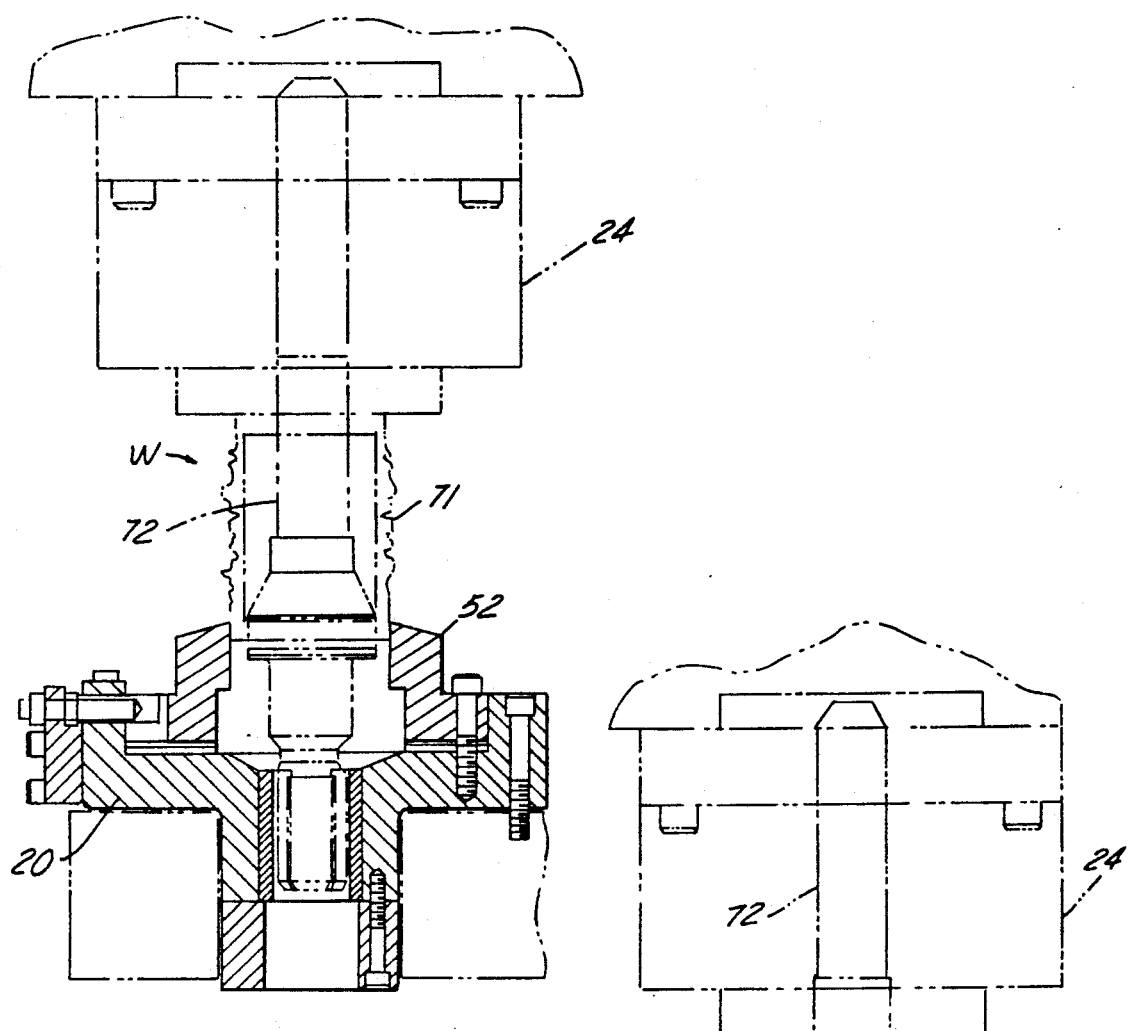
FIG. 13 is a fragmentary sectional view of a broach on the indexing table.

The table is mounted in horizontal position on the base for rotation about a central vertical axis. The table is rotated step-by-step by a conventional index drive on the machine base powered by a motor 30. The tool stations 20, the load station 16 and the unload station 18 are arranged on the top surface of the table in equally circumferentially spaced apart relation in a circle concentric with the central axis of rotation. Broaches 52, 54, 56, 58, 60 and 62 are affixed to the respective tool stations. These broaches are bolted to the respective stations as shown in FIG. 13.

Figure 14:
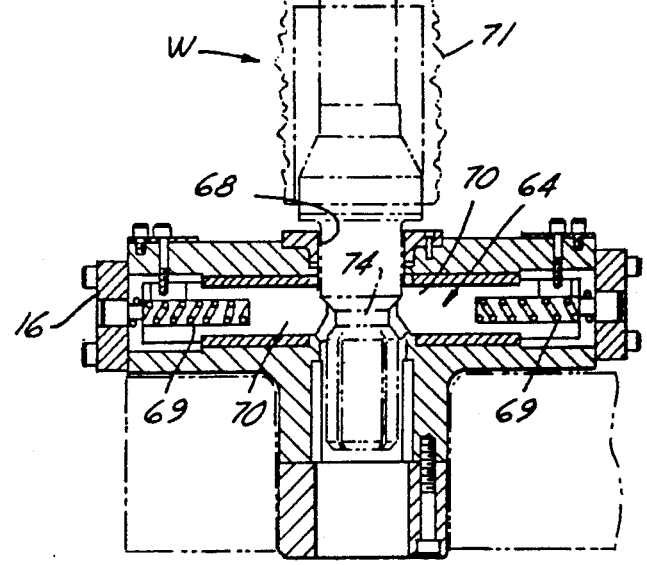
FIG. 14 is a fragmentary sectional view of a load station on the index table.

The load station and unload station each has a workpiece gripper 64 (FIG. 14). These grippers 64 may be identical and in this instance each has a socket or recess 68 to receive the lower end of the workpiece W and opposed gripper fingers 70 which are urged toward one another by springs 69. Each workpiece comprises a tubular part 71 to be broached which is sleeved on and secured to an elongated vertical arbor 72. For purposes of this description, the entire assembly consisting of the tubular part 71 and the arbor 72 will be referred to as the workpiece. The lower end of the arbor will fit into the recess 68 in the gripper at the load and unload stations and has a reduced tapered neck portion 74 into which the gripper fingers 70 snap to releasably retain the workpiece. The confronting ends of the fingers are tapered so that when an arbor is pressed down into recess 68 the fingers will be cammed apart to receive the arbor, and when the arbor is pulled upwardly the fingers will be caromed apart to release the arbor.

Figure 12:
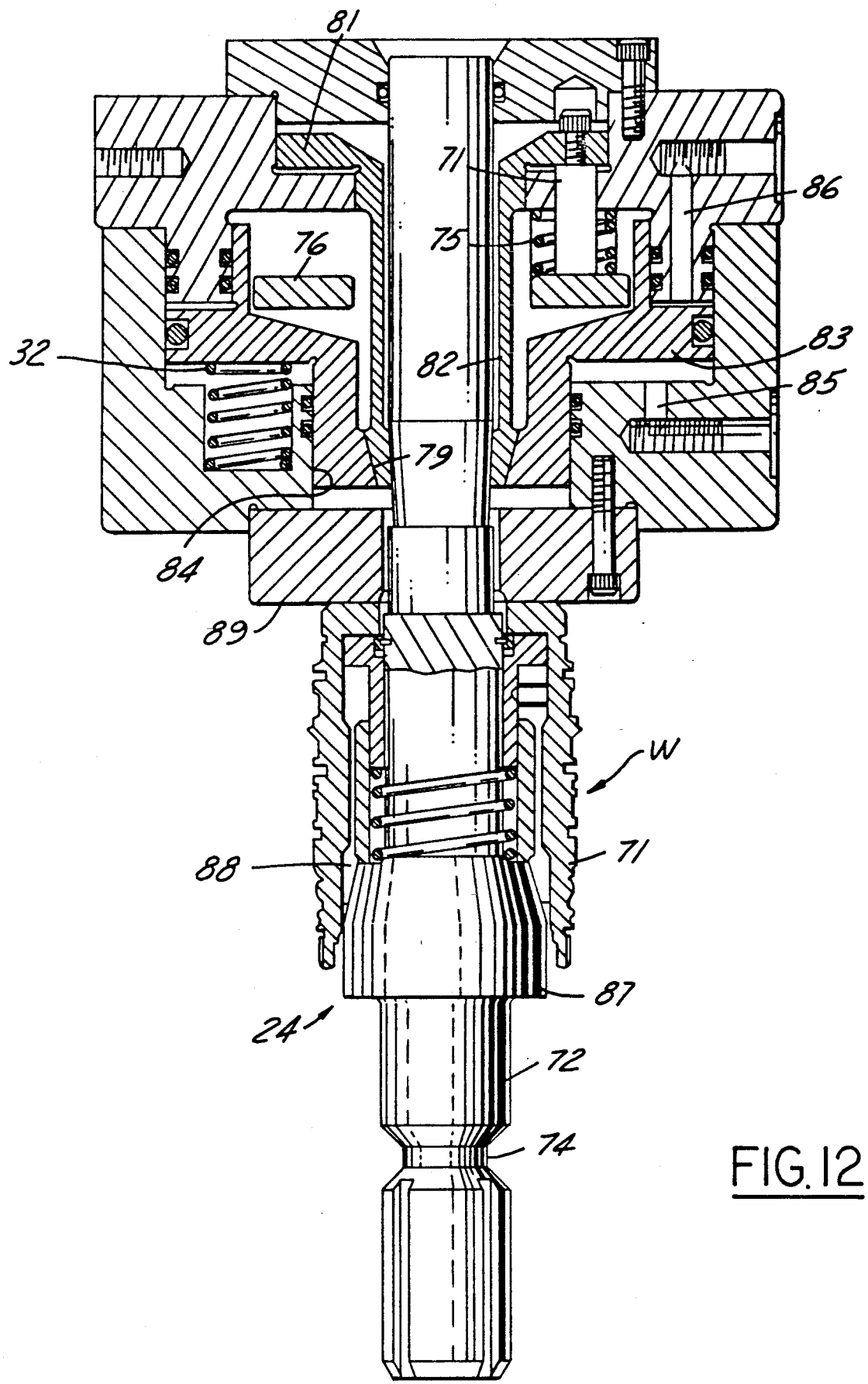
FIG. 12 is an enlarged sectional view showing the clamping of a workpiece by a ram.

The rams 22 and 24 may be identical and are mounted on diametrically opposite sides of the table. Each ram is mounted for vertical movement in ram guides 80 and is capable of releasably gripping the upper end of the arbor of a workpiece. More specifically, each ram is open at the bottom to receive the upper end of an arbor (FIG. 12). When a ram moves down to pick up a workpiece, the workpiece arbor projects up into the open bottom of the ram with the part 71 close to the bottom surface 89 of the ram. A ram collet 81 has a circle of resilient fingers 82 adapted to surround the arbor. An annular piston 83 reciprocable in cylinder 84 in the ram is raised by pressure fluid entering the cylinder through port 85 beneath the piston, assisted by springs 32, and is lowered by pressure fluid entering the cylinder through port 86 above the piston. When piston 83 is raised, its tapered portion 79 surrounding collet fingers 82 cams the fingers into gripping engagement with the arbor. The fingers 82 are raised by this action, so that the gripped arbor is also raised. When piston 83 is lowered, the fingers are permitted to release the arbor. Springs 75 compressed between the cylinder 84 and a ring 76 mounted on pins 77 carried by the collet 81 urge the collet downwardly when the piston 83 lowers.

The arbor has an enlargement 87 beneath its upper end encircled by the part 71 to be broached. The upper portion of this enlargement is tapered and engages a circle of collet fingers 88. When the piston 83 is raised as previously described, the arbor is also raised and the enlargement forces the collet fingers 88 outwardly into firm engagement with the part 71 and also raises the top of the part 71 into solid abutting engagement with the bottom surface 89 of the ram.

The workpieces W when carried by the rams are above and vertically aligned with the circle of stations on the table. A reversible piston-cylinder assembly 91 or other suitable means is provided to raise and lower each ram.

Figure 8:
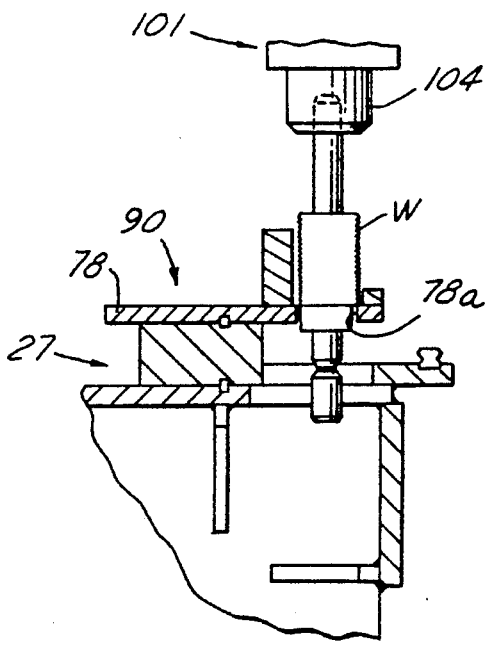
FIG. 8 is a fragmentary sectional view taken at the exchange depot.

An exchange depot 90 (FIGS. 2 and 8) is provided at the rear of the machine. The exchange depot has a horizontal support plate 78 with holes 78a for receiving and supporting the workpieces. The workpieces are supported by the support plate in spaced apart relation corresponding to the spacing between the jaws 104 and 106 of the transfer shuttle described more fully hereinafter. Workpieces with parts to be broached are picked up at the exchange depot by a transfer shuttle 92 of loader-/unloader 27 and are returned to the exchange depot after the parts are broached for removal and collection.

The transfer shuttle 92 (FIGS. 1-7) has a frame 94 mounted on parallel, horizontal bars 96 of a guide for horizontal movement from the rear of the machine adjacent the exchange depot to the front of the machine along a path directly above the central axis of the table and perpendicular to a line connecting the rams. The guide bars 96 are supported above the table and have their rear ends secured to a stand 97 adjacent the rear of the table 12. The front ends of the guide bars 96 are supported from above by a bracket 93 carried by a fixed frame 95.

Figure 10:
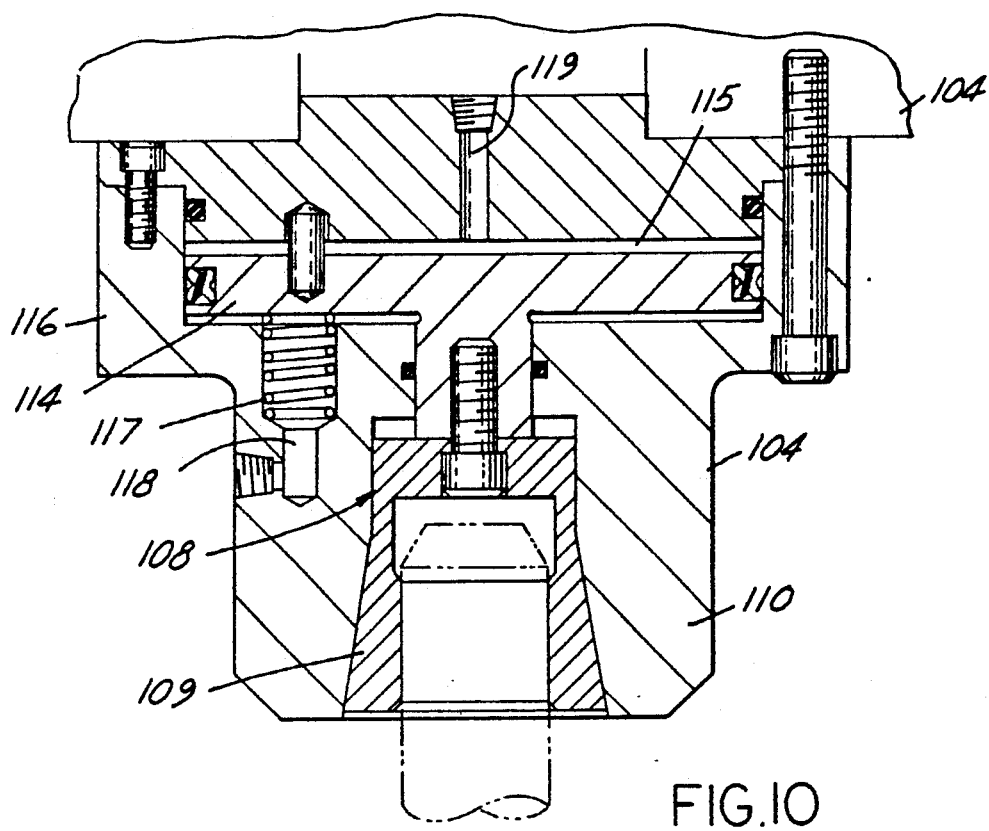
FIG. 10 is an enlarged sectional view showing the clamping of a workpiece by a jaw assembly of the transfer shuttle.
Figure 11:
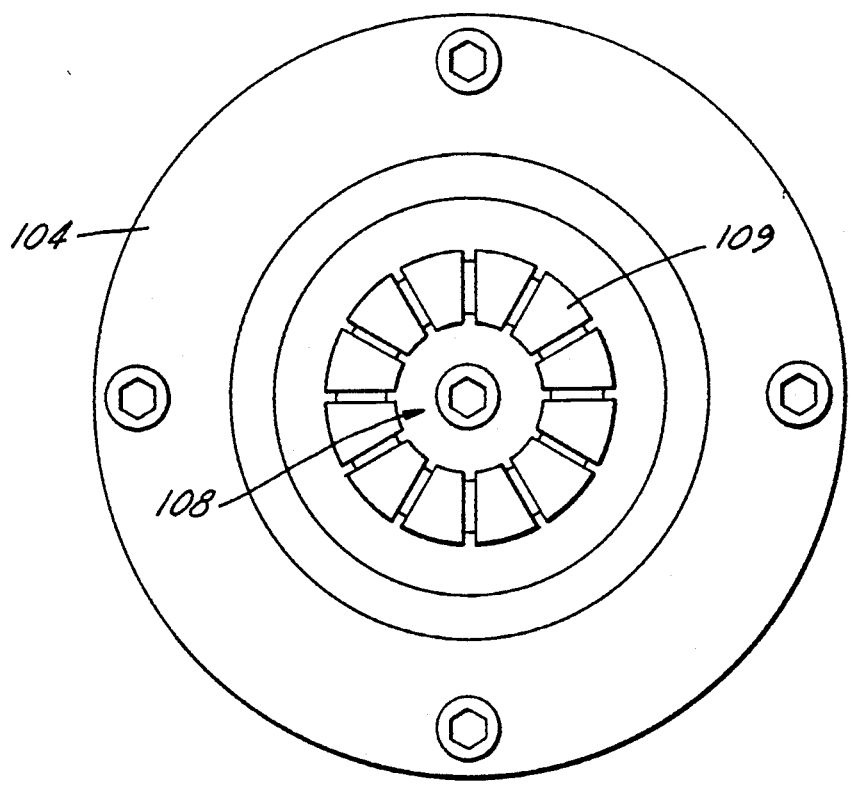
FIG. 11 is a bottom view of the jaw assembly in FIG. 10.

The shuttle frame supports a plate 98 which has vertical rods 99 reciprocable in guide sleeves 99'. The plate 98 is moved vertically relative to the frame along the guide sleeves 99' by a reversible piston-cylinder assembly 100. A jaw assembly 101 is mounted for rotation on the plate 98 about the vertical axis of a shaft 102. The jaw assembly 101 has two laterally spaced vertically disposed jaws 104 and 106 spaced equally from the axis of rotation of jaw assembly 101. Each jaw has a gripper 108 provided with flexible gripping elements 109 (FIGS. 10 and 11). The gripper 108 is raised and lowered within an internally cone-shaped sleeve 110 by a piston 114 within a cylinder 115 in jaw housing 116. The piston 114 is raised by fluid pressure entering cylinder 115 through port 118, assisted by springs 117, to raise the gripper, causing gripping elements 109 to be cammed inwardly by the sleeve 110 and grip the top of an arbor of a workpiece. The piston is lowered by fluid pressure entering the cylinder 115 through port 119 to release the arbor.

The jaw assembly 101 is rotated about its axis by a piston-cylinder assembly 120, the rod from the piston of which meshes with a gear (not shown) on the jaw assembly 101 to rotate The jaw assembly 101 has essentially three operative rotative positions, one such position in which the two jaws are aligned with the direction of shuttle movement, a second position 180° from the first in which the jaws are reversed, and a third position mid-way between the first two in which the jaws are perpendicular to the direction of shuttle movement.

The shuttle is moved along guide bars 96 by a motor and ball screw drive 122 from a first position adjacent to the exchange depot 90 to a second position over the rear edge portion of the table, to a third position over the front edge portion of the table. When the shuttle 92 is in its first position with the jaw assembly 101 turned to its intermediate position in which the jaw assembly 101 is perpendicular to the direction of shuttle movement, the jaws 104 and 106 are directly over the exchange depot 90 in order to pick up two unbroached workpieces W and also to deposit two workpieces after broaching. When the shuttle is in its second position over the rear edge portion of the table, the jaw assembly 101 is turned so as to be aligned with the direction of shuttle movement and the axis of rotation of the jaw assembly is spaced laterally from the circle of stations on the table by a distance equal to one half the space between the jaws 104 and 106 so that one of the jaws is directly over the circle of stations. When the shuttle is in its third position over the front edge portion of the table with the jaw assembly 101 aligned with the direction of shuttle movement, the axis of rotation of the jaw assembly is spaced laterally from the circle of stations on the table by a distance equal to one half the space between the jaws 104 and 106 so that one of the jaws is directly over the circle of stations. Obviously, in both of the second and third positions, when the jaw assembly is turned 180° the other jaw assumes a position directly over the circle of stations.

The various power sources, that is the piston-cylinder assemblies 91 for moving the rams, the ram collet piston-cylinder assemblies 83, 84, the shuttle motor and ball screw drive 122, the piston-cylinder assembly 100 for raising and lowering the shuttle jaw assembly, the piston-cylinder assembly 120 for rotating the jaw assembly, and the piston-cylinder assembly 114,115 for the shuttle jaws 104 and 106 are preferably, but not necessarily controlled automatically as to sequence and timing in relation to table indexing. The following is a description of the operation of the apparatus.

In operation, the rams 22 and 24, each carrying a workpiece W, are simultaneously moved up and down between intermittent indexing of the table. During this ram movement, one of the stations is directly under the workpiece carried by one ram and another station is directly under the workpiece carried by the other ram. The workpieces W are progressively broached by the broaches at the six work stations. After a workpiece on one of the rams is broached at the sixth station 62, the table indexes the unload station 18 under that workpiece and its ram moves downwardly to cause the lower end of the workpiece arbor to enter the unload station. The spring loaded fingers 70 at the unload station extend into the neck 74 of the arbor to retain the workpiece. The ram chuck is released by fluid pressure through port 86 acting to lower piston 83. The ram is raised leaving the workpiece held in the unload station. This workpiece is subsequently picked up by the shuttle 92 as will be more fully described hereinafter. The workpiece W on the other ram is transferred to the unload station after broaching in the same manner, also to be picked up by the shuttle 92.

After a broached workpiece is deposited by a ram at the unload station 18, the next indexing of the table brings the load station 16 under that ram. The load station brings with it a workpiece to be broached which has been deposited at the load station by the shuttle 92. When the ram is lowered, the upper end of the arbor of that workpiece is extended up into the open ram chuck which is then closed by fluid pressure entering the port 85 to raise piston 83 to close the chuck and grip the arbor. When the ram then goes up, it takes with it the clamped workpiece.

Let it be assumed that the shuttle 92 is in its first position shown in FIG. 2 adjacent to the exchange depot 90 with its jaw assembly 101 perpendicular to the direction of shuttle movement and the jaws 104 and 106 directly over two workpieces W at the exchange depot, and with the workpiece arbors disposed vertically and each arbor carrying a part to be broached.

The fluid cylinder assembly 100 will move the jaw assembly 101 down causing the arbors of the two workpieces to enter the open jaws 104 and 106 of the jaw assembly. At the end of the down stroke of the jaw assembly 101, the cylinders 114, 115 will be actuated to cause jaws 104 and 106 to close and grip the arbors. The cylinder 100 will then be actuated to retract the jaw assembly 101 to a up position, thereby lifting the two workpieces out of the exchange depot 90.

Figure 3:
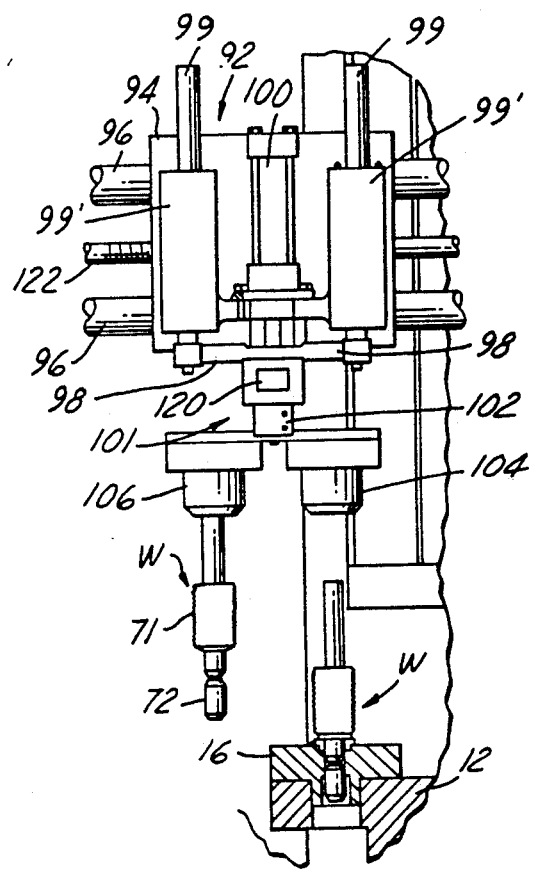
FIG. 3 is a fragmentary elevational view showing a portion of FIG. 2, but with the shuttle adjacent the rear edge of the table.
Figure 5:
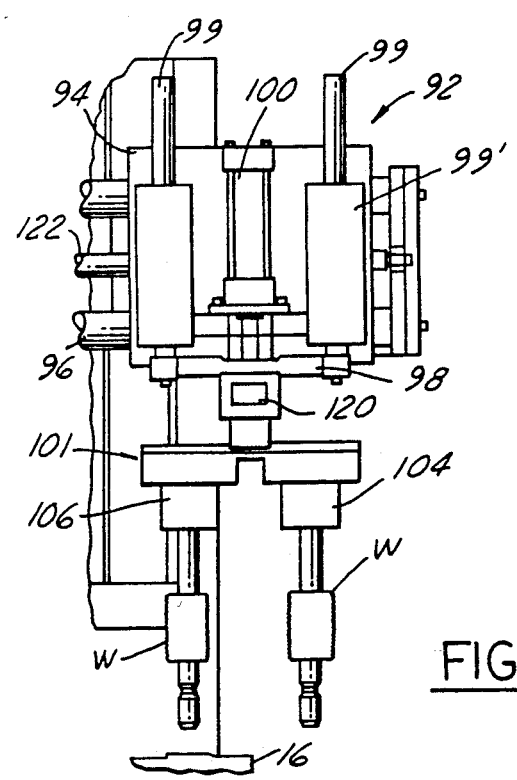
FIGS. 4 and 5 are similar to FIG. 3, but show the shuttle in different positions adjacent the front edge of the table.

The motor and ball screw drive 122 is next actuated to move the shuttle 92 horizontally to its second position (FIG. 3) adjacent the rear edge portion of the table and with the axis of rotation of the jaw assembly spaced in the direction of shuttle movement from the circle of stations on the table by a distance equal to one half the space between the jaws 104 and 106. After arriving at the second position, the rotatable jaw assembly 101 will be actuated by the cylinder assembly 120 to rotate the jaw assembly 90° so that the jaws 104, 106 are now aligned with the direction of shuttle movement and the jaw 104 is directly over the circle of stations on the table. At the appropriate time relative to table indexing when the load station 16 is directly beneath jaw 104, cylinder 100 will be actuated to move the jaw assembly 101 down thereby inserting the lower end of the arbor of the workpiece held by jaw 104 into the load station 16. Insertion of the lower end of the arbor into the load station causes the opposed fingers 70 at the load station to be cammed apart and then to snap into the reduced neck portion 74 of the arbor to releasably retain the arbor. At the completion of the down stroke of cylinder 100, the jaw 104 will be actuated by cylinder 115 to open, after which the jaw assembly 101 will be raised by cylinder 100, but the workpiece deposited at the load station will remain at the load station (FIG. 3). Now, jaw 104 is empty and jaw 106 still carries an unbroached workpiece.

At the end of the up stroke of the cylinder 100, the motor and ball screw drive 122 will be actuated to move the shuttle 92 to its third position adjacent the front edge portion of the table, and while moving to the third position, the rotating jaw assembly 101 will be actuated by cylinder 120 to rotate the jaw assembly 180°.

Figure 4:
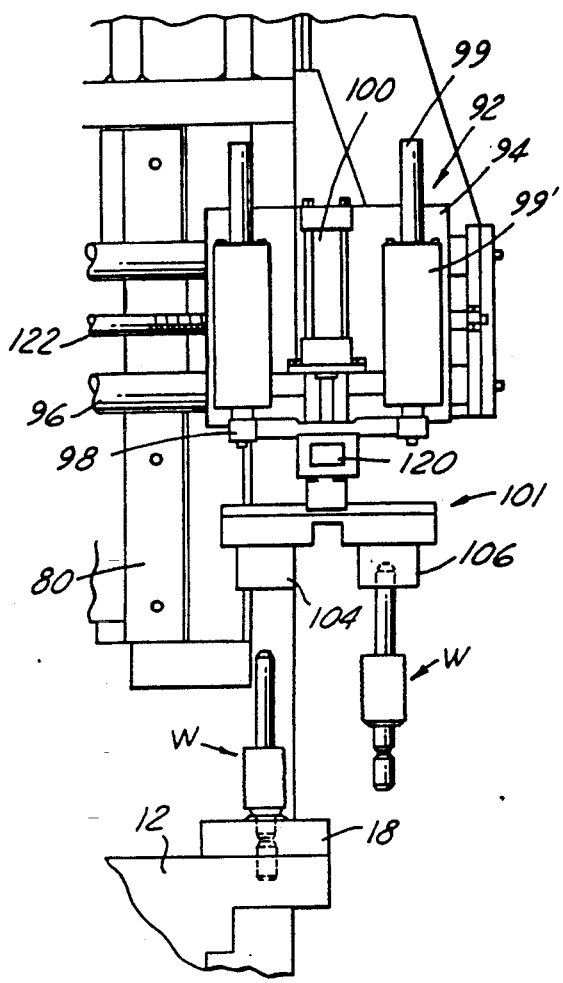

Upon arriving at the third position (FIGS. 4 and 5), the shuttle 92 will wait until the index table rotates into position and brings a broached workpiece in the unload station 18 under the rotatable jaw assembly 101. In this third position of the jaw assembly, its axis of rotation is spaced in the direction of shuttle movement from the circle of stations on the table by a distance equal to one half the space between the jaws 104 and 106 so that the jaw 104 is now directly over the circle of stations, in line with the unload station 18 (FIG. 4). Cylinder 100 will be actuated and the jaw assembly 101 moved down causing the open jaw 104 to be positioned on the upper end of the arbor of a broached workpiece at the unload station. At the end of the down stroke of the jaw assembly, the jaw 104 will be actuated to close, thereby clamping on the arbor. After the jaw 104 has clamped the arbor, the jaw assembly will move up by action of the cylinder 100. Jaw 104 now carries a broached workpiece and jaw 106 an unbroached workpiece.

At the end of the up stroke, the rotatable jaw assembly 101 is rotated 180° by cylinder 120, after which the jaw assembly will wait in this location until the index table moves the load station 16 into position directly under jaw 106. When the load station arrives at this position (FIG. 5), the jaw assembly 101 will move down, actuated by cylinder 100, inserting the workpiece which jaw 106 carries into the load station. At the end of the down stroke of the jaw assembly, jaw 106 will be actuated to release the workpiece and the workpiece will then be held in the load station as previously described. After the jaw 106 is open, the rotating jaw assembly will move up by the operation of cylinder 100. Now, jaw 106 is empty and jaw 104 carries a broached workpiece.

At the end of the up stroke of the jaw assembly the shuttle 92 will be moved by the motor and ball screw drive 122 back to position two, and while the shuttle is moving, the rotatable jaw assembly 101 will rotate 180° by operation of the cylinder 120.

Figure 6:
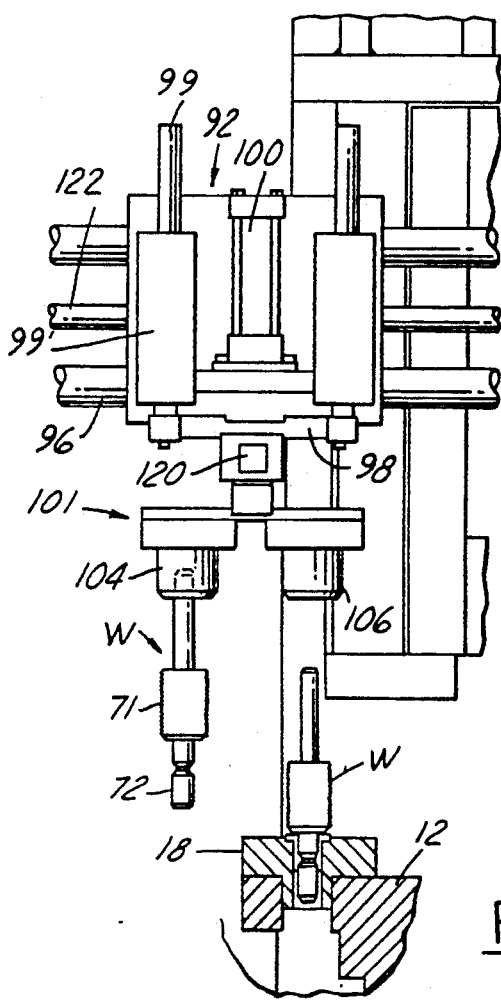
FIGS. 6 and 7 are similar to FIG. 3, but show the shuttle in different stages in its operation, adjacent the rear of the table.
Figure 7:
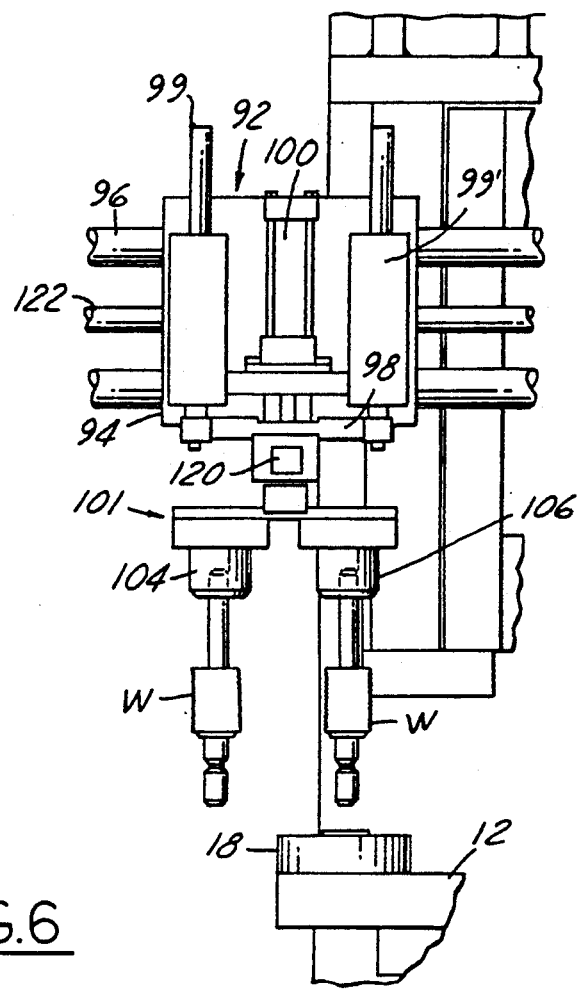

After returning to position number two, the jaw assembly 101 will wait until the index table moves the unload station 18 with a broached workpiece into position under jaw 106 (FIG. 6). After the broached workpiece arrives under jaw 106, the cylinder 100 will be actuated and the jaw assembly 101 will move down positioning jaw 106 on the workpiece. At the end of the down stroke, the jaw 106 will be actuated and will close and clamp on the upper end of the arbor of the workpiece. After the jaw has closed, the jaw assembly will move up actuated by cylinder 100. The fingers of the clamp at the unload station will release to permit the broached workpiece to move up with the jaw assembly. Now both jaws 104 and 106 carry broached workpieces.

At the completion of the up stroke (FIG. 7), the jaw assembly will be actuated by cylinder 120 to rotate 90° and thereafter the shuttle will be moved to the exchange depot by the motor and ball screw drive. After arriving at the exchange depot, the cylinder 100 will be actuated to cause the jaw assembly 101 to move down and deposit the two broached workpieces at the exchange depot. At the end of the down stroke, the jaws 104 and 106 will open, actuated by the cylinders 114, 115. With the jaws 104 and 106 open, the jaw assembly will be raised, leaving the broached workpieces at the exchange depot. Mechanism which forms no part of this invention will then be actuated to remove the broached workpieces while presenting two new workpieces to be broached in a position to be picked up by the jaw assemblies as previously described, for a repeat of the action.

What is claimed is:

1. Apparatus for the progressive blind broaching of a plurality of workpieces comprising an indexing table having a central axis, means mounting said table for rotation about said central axis, means for intermittently indexing said table about said central axis in a step-by-step motion, a load station, an unload station, tool stations, all of said stations being arranged on said table in circumferentially spaced relation in a circle about said central axis, broaches mounted on said table at said tool stations, first and second rams mounted in circumferentially spaced relation adjacent to said table, each of said rams being adapted to releasably mount a workpiece to be broached opposite said circle of stations, means for moving said rams toward and away from said table at intervals between intermittent table indexing to cause said broaches to perform a material removing cut on workpieces mounted on said rams, said load station having a releasable workpiece holder to deliver unbroached workpieces to said rams for broaching and said unload station having a releasable workpiece holder adapted to receive broached workpieces from said rams after broaching, a workpiece exchange depot at one side of said table, and means for transferring workpieces from said exchange depot to said load station and for transferring workpieces from said unload station to said exchange depot, said transferring means being arranged so as not to occupy or obstruct space along the remaining sides of said table.

2. Apparatus as defined in claim 1, wherein said transfer means comprises a shuttle movable along a path above said table.

3. Apparatus as defined in claim 1, wherein said rams are located diametrically opposite one another, and said transfer means comprises a shuttle movable along a path above said table and perpendicular to a straight line connecting said rams.

4. Apparatus as defined in claim 3, wherein said shuttle has pick-up and deposit means for pick up and depositing workpieces at said exchange depot and said load and unload stations.

5. Apparatus for the progressive blind broaching of a plurality of workpieces comprising an indexing table having a central axis, means mounting said table for rotation about said central axis, means for intermittently indexing said table about said central axis in a step-by-step motion, a load station, an unload station, tool stations, all of said stations being arranged on said table in circumferentially spaced relation in a circle about said central axis, broaches mounted on said table at said tool stations, first and second rams mounted in circumferentially spaced relation adjacent to said table, each of said rams being adapted to releasably mount a workpiece to be broached opposite said circle of stations, means for moving said rams toward and away from said table at intervals between intermittent table indexing to cause said broaches to perform a material removing cut on workpieces mounted on said rams, said load station having a workpiece holder to deliver unbroached workpieces to said rams for broaching and said unload station having a releasable workpiece holder adapted to receive broached workpieces from said rams after broaching, a workpiece exchange depot adjacent said table, and means for transferring workpieces from said exchange depot to said load station and for transferring workpieces from said unload station to said exchange depot, said transferring means comprising a shuttle, means for moving said shuttle from a first position adjacent said exchange depot to a second position adjacent said circle of stations at one side of said table and to a third position adjacent said circle of stations at the opposite side of said table, said shuttle having workpiece pick-up and deposit means, said pick-up and deposit means, when said shuttle is at said first position, being operative to deposit two broached workpieces at said exchange depot and to pick up two unbroached workpieces from said exchange depot, said pick-up and deposit means, when said shuttle is at said second position, being operative to pick up a first broached workpiece from said unload station and deposit one of the unbroached workpieces at said load station, said pick-up and deposit means, when said shuttle is at said third position, being operative to pick up a second broached workpiece from said unload station and deposit the other unbroached workpiece at said load station, said first and second broached workpieces being subsequently deposited at said exchange depot as aforesaid.

6. Apparatus as defined in claim 5, wherein said shuttle moves along a path between said rams.

7. Apparatus as defined in claim 5, wherein said rams are located diametrically opposite one another.

8. Apparatus as defined in claim 5, wherein said pick-up and deposit means, when said shuttle is at said second and third positions, picks up and deposits workpieces at intervals between table indexing.

9. Apparatus as defined in claim 5, wherein said exchange depot is located at said one side of said table.

10. Apparatus as defined in claim 5, wherein said pick-up and deposit means comprises a pair of workpiece grippers.

11. Apparatus as defined in claim 10, wherein said pair of workpiece grippers are mounted on said shuttle for rotation about an axis extending transversely of the path of shuttle movement.

12. Apparatus as defined in claim 11, wherein said workpiece grippers are mounted on said shuttle for movement toward and away from said table.

13. Apparatus as defined in claim 5, wherein said rams are located diametrically opposite one another and said shuttle moves along a path between said rams and perpendicular to a straight line connecting said rams.

14. Apparatus as defined in claim 13, wherein said pick-up and deposit means, when said shuttle is at said second and third positions, picks up and deposits workpieces at intervals between table indexing.

15. Apparatus as defined in claim 14, wherein said exchange depot is located at said one side of said table.

16. Apparatus as defined in claim 15, wherein said pick-up and deposit means comprises a pair of workpiece grippers.

17. Apparatus as defined in claim 16, wherein said pair of workpiece grippers are mounted on said shuttle for rotation about an axis extending perpendicular to the path of shuttle movement and for movement toward and away from said table.

18. Apparatus as defined in claim 17, wherein said workpiece grippers, when said shuttle is in said second and third positions, are capable of pivoting from a position in which one of said workpiece grippers is directly over said circle of stations to another position in which the other of said workpiece grippers is directly over said circle of stations.

* * * * *